(12) United States Patent
Butler

(10) Patent No.: US 9,855,733 B2
(45) Date of Patent: Jan. 2, 2018

(54) METHOD FOR ACHIEVING LOW POROSITY IN COMPOSITE LAMINATES

(71) Applicant: The Boeing Company, Chicago, IL (US)

(72) Inventor: Geoffrey A. Butler, Seattle, WA (US)

(73) Assignee: The Boeing Company, Chicago, IL (US)

( * ) Notice: Subject to any disclaimer, the term of this patent is extended or adjusted under 35 U.S.C. 154(b) by 315 days.

(21) Appl. No.: 14/636,012

(22) Filed: Mar. 2, 2015

(65) Prior Publication Data

US 2016/0257102 A1 Sep. 8, 2016

(51) Int. Cl.
| | |
|---|---|
| *B32B 7/04* | (2006.01) |
| *B32B 37/00* | (2006.01) |
| *B32B 37/10* | (2006.01) |
| *B29C 70/54* | (2006.01) |
| *B29C 70/00* | (2006.01) |
| *B29C 70/20* | (2006.01) |
| *B29C 70/30* | (2006.01) |
| *B32B 37/02* | (2006.01) |
| *B32B 37/18* | (2006.01) |
| *B32B 38/00* | (2006.01) |
| *B32B 38/18* | (2006.01) |

(52) U.S. Cl.
CPC ......... *B32B 37/1009* (2013.01); *B29C 70/00* (2013.01); *B29C 70/202* (2013.01); *B29C 70/30* (2013.01); *B29C 70/547* (2013.01); *B32B 37/0076* (2013.01); *B32B 37/02* (2013.01); *B32B 37/1045* (2013.01); *B32B 37/18* (2013.01); *B32B 38/0004* (2013.01); *B32B 2038/0076* (2013.01); *B32B 2038/1891* (2013.01)

(58) Field of Classification Search
CPC .................... B29C 70/382; B29C 2043/3644
USPC .................... 156/523, 574, 577, 292
See application file for complete search history.

(56) References Cited

U.S. PATENT DOCUMENTS

| | | | | |
|---|---|---|---|---|
| 2010/0065367 | A1* | 3/2010 | Vermilyea | B29C 66/721 181/290 |
| 2012/0300221 | A1* | 11/2012 | Bennison | G01B 11/14 356/601 |
| 2013/0251958 | A1* | 9/2013 | Gawn | B29C 70/083 428/189 |
| 2014/0081444 | A1* | 3/2014 | Rudberg | G05B 19/182 700/142 |
| 2014/0174641 | A1* | 6/2014 | Roman | D03D 3/004 156/182 |

OTHER PUBLICATIONS

Cytec Engineering, "CYCOM_5320_Data_Sheet," dated Mar. 2012.
Benson et al., "Automated Fiber Placement of Advanced Materials," AFRL-ML-WP-TP-2006-424, Apr. 2006.

* cited by examiner

*Primary Examiner* — Scott W Dodds

(57) ABSTRACT

A method of manufacturing a composite laminate may include laying up bands of composite material in layers to form a composite layup. At least one layer may have at least one gap between an adjacent pair of bands. The gap may extend continuously along a lengthwise direction of the band. The gap in two or more of the layers may be fluidly interconnected and may form at least one breather path that opens to an exterior of the composite layup.

20 Claims, 9 Drawing Sheets

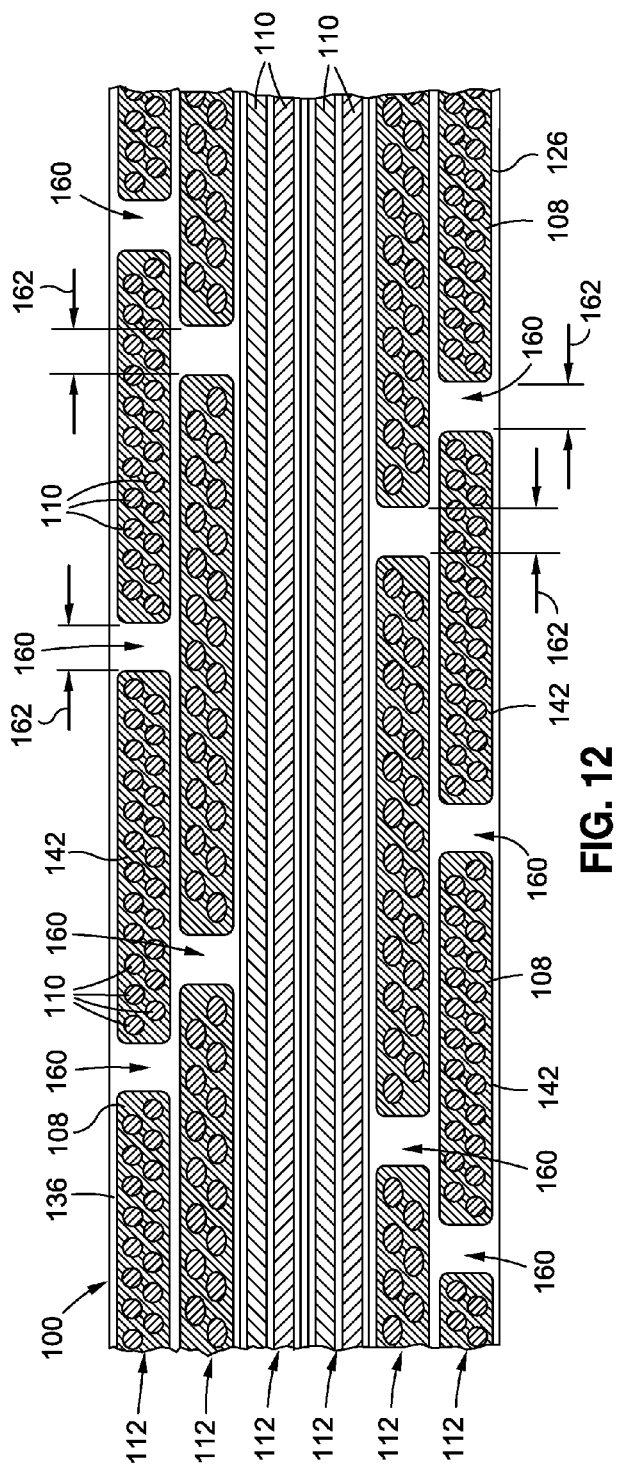
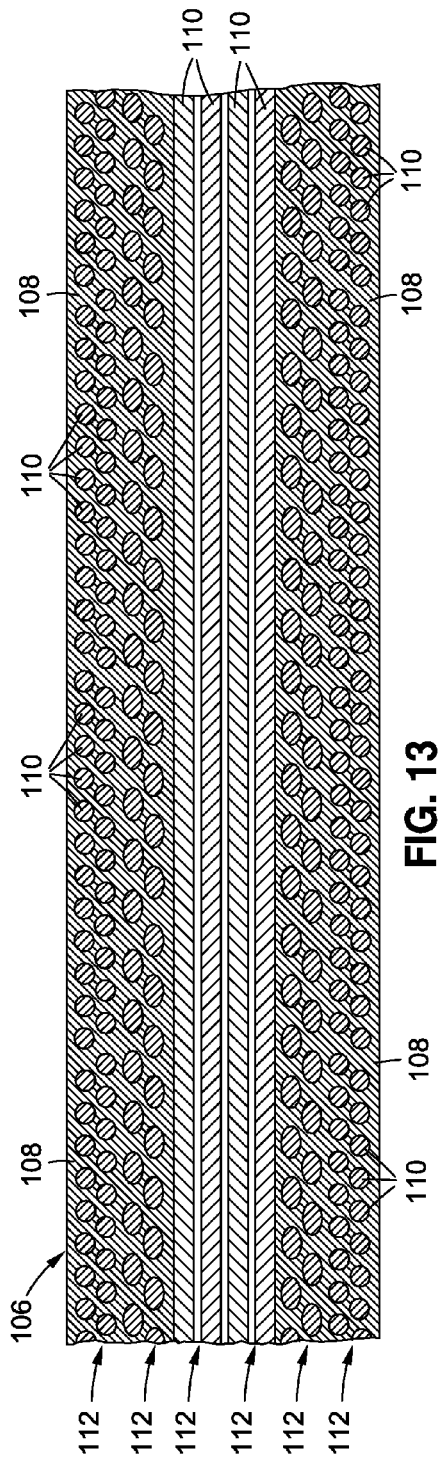

METHOD FOR ACHIEVING LOW POROSITY IN COMPOSITE LAMINATES

FIELD

The present disclosure relates generally to composites manufacturing and, more particularly, to manufacturing methods to achieve low porosity in composite laminates cured with relatively low compaction pressure.

BACKGROUND

Conventional methods of manufacturing fiber-reinforced composite laminates include laying up a stack of composite plies over a forming tool to form a composite layup. Heat and pressure may be applied to the composite layup to consolidate and cure the composite layup into a final composite laminate. For some composite laminates, it is necessary to cure the composite layup inside of an autoclave to provide the relatively high compaction pressures necessary to achieve the desired mechanical properties in the cured composite laminate. For example, high compaction pressure may be necessary to evacuate entrapped moisture, air, and/or volatiles from a composite layup during consolidation and curing such that low porosity and high strength may be achieved in the cured composite laminate.

Traditional autoclave processing of composite laminates may require extended periods of time during which heat and compaction pressure are applied to the composite layup. For example, the consolidation and curing of a composite layup in an autoclave can take up to 24 hours. Unfortunately, autoclaves are generally expensive to construct and operate. In addition, the extended periods of time required to process and cure a composite laminate inside of an autoclave may be prohibitive for large-scale production programs requiring high part-production rates.

As can be seen, there exists a need in the art for a method of curing a composite layup to produce a low-porosity composite laminate without the need for an autoclave.

SUMMARY

The present disclosure provides a method of manufacturing a composite laminate including laying up bands of composite material in layers to form a composite layup. At least one of the layers may have at least one gap between an adjacent pair of bands. The gap may extend continuously along a lengthwise direction of the bands. The gap in two or more of the layers may be fluidly interconnected or coupled, and may form at least one breather path that opens to an exterior of the composite layup.

In a further embodiment, disclosed is a method of manufacturing a composite laminate including the step of laying up bands of composite material in layers to form a composite layup, wherein at least one of the layers has a gap between an adjacent pairs of bands. The gaps may extend continuously along a lengthwise direction of the bands. The gaps may be fluidly coupled and may form breather paths that open to an exterior of the composite laminate. The method may further include applying heat and compaction pressure to the composite laminate, and consolidating the composite laminate in response to the application of compaction pressure, and curing the composite laminate in response to the application of heat. The method may additionally include controlling a temperature and compaction pressure of the composite layup in such a manner preventing closing off of the gaps and/or the breather paths during consolidation and prior to completion of cure of the composite layup.

In a still further embodiment, disclosed is a method of manufacturing a composite laminate including laying up tows of composite material using an automated fiber placement (AFP) machine to form a composite layup. The AFP machine may lay up the tows in a manner providing gaps with a gap width of between 0.005-0.030 inch between the tows. The gaps may be fluidly connected to one another and may form an interconnected network of breather paths that each open to an exterior of the composite layup. The method may additionally include applying no more than 1 atmosphere of compaction pressure to the composite layup in an out-of-autoclave process.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 12 is a diagrammatic representation of a sectional view of a portion of the composite layup of FIG. 2 prior to curing and illustrating the gaps between the bands of composite material in one or more of the layers in accordance with one example embodiment;

FIG. 13 is a diagrammatic representation of a sectional view of the composite layup of FIG. 12 after consolidation and curing and illustrating resin and fibers filling the gaps to form a cured composite laminate having low porosity in accordance with one example embodiment.

DETAILED DESCRIPTION

Figure 1:
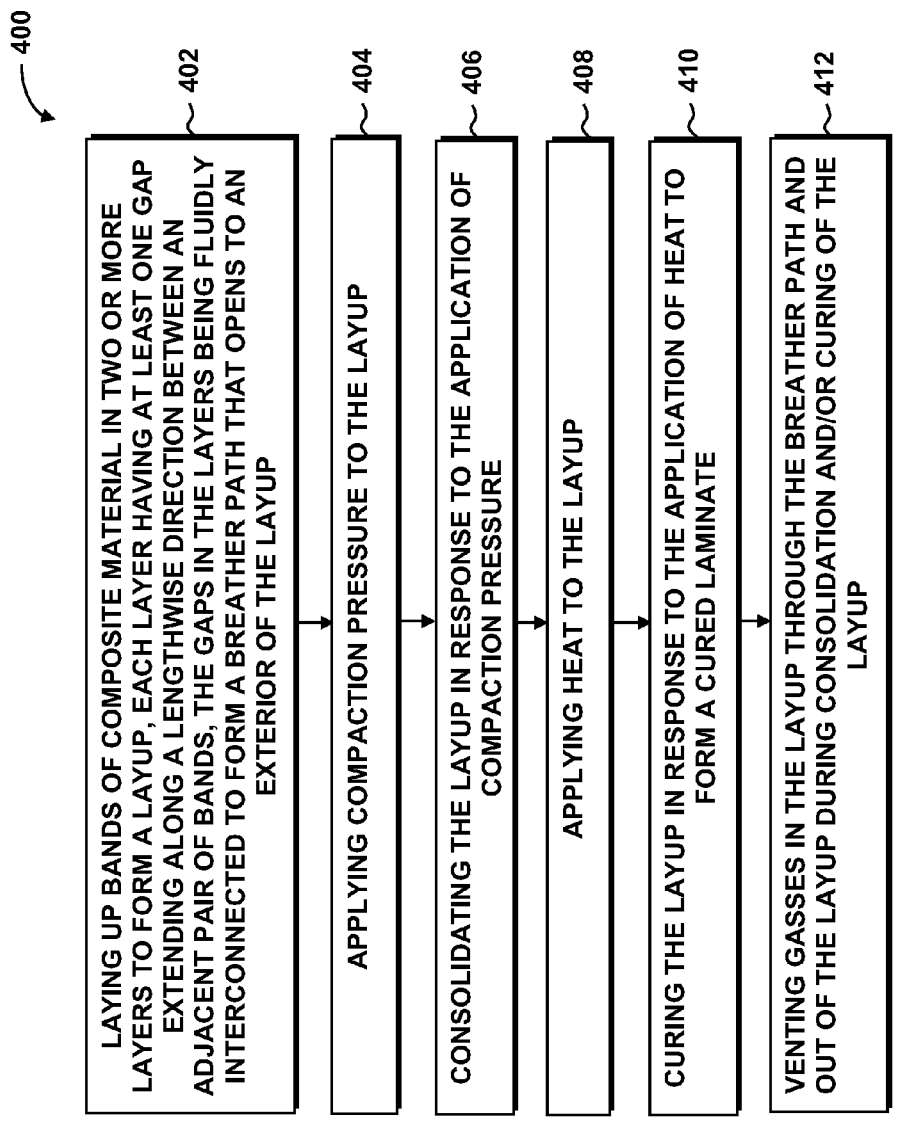
FIG. 1 is a flowchart having one or more operations that may be included in a method of manufacturing a composite laminate in accordance with one example embodiment.
Figure 2:
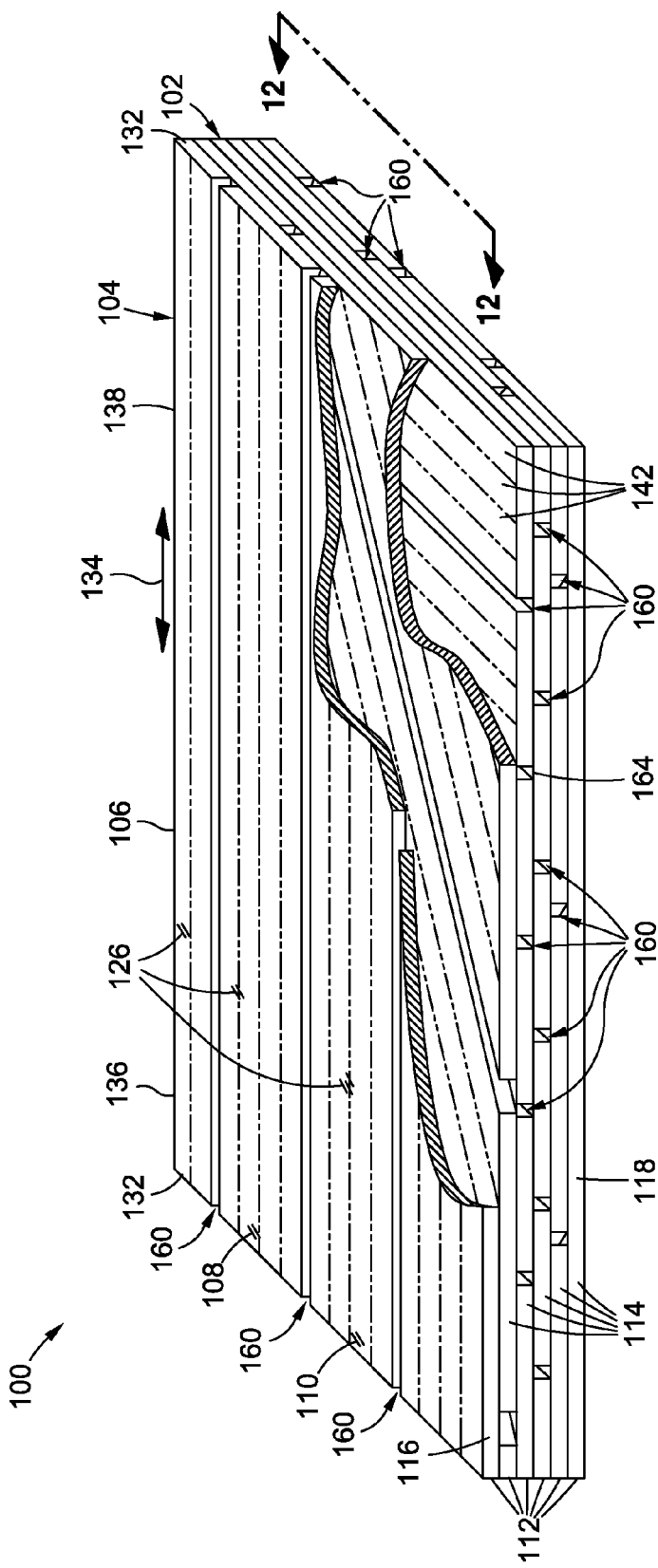
FIG. 2 is a diagrammatic representation of a perspective view of a composite layup made up of a stack of layers, wherein one or more of the layers are formed of bands of composite material, and wherein one or more of the layers may include one or more engineered gaps extending lengthwise between adjacent bands in accordance with one example embodiment.
Figure 3:
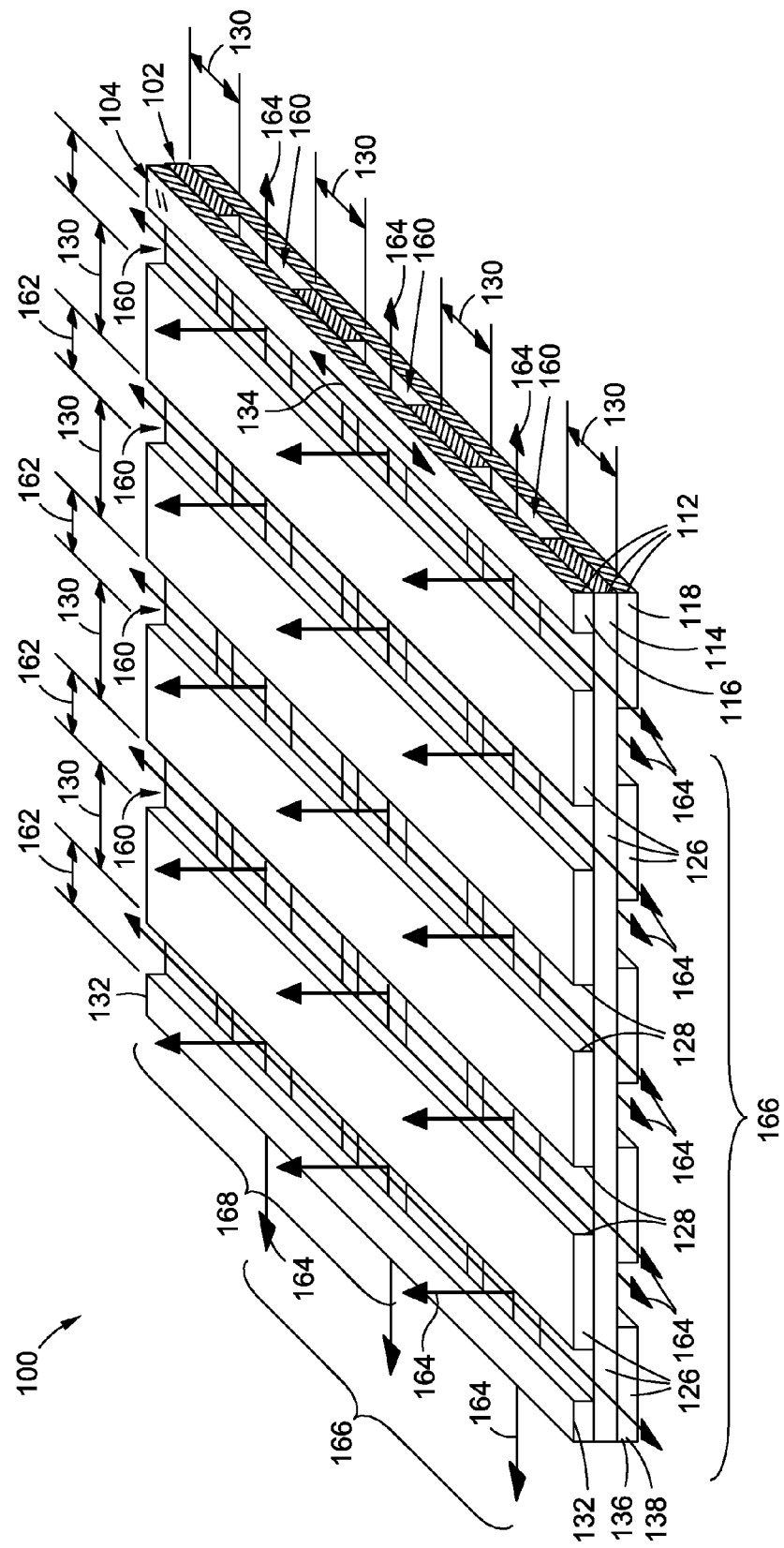
FIG. 3 is a schematic perspective view of a composite layup illustrating gaps extending lengthwise between the bands in one or more of the layers and forming an interconnected network of breather paths that may open to the exterior of the layup for venting entrapped moisture, air, and/or volatiles from the interior of the composite layup in accordance with one example embodiment.
Figure 4:
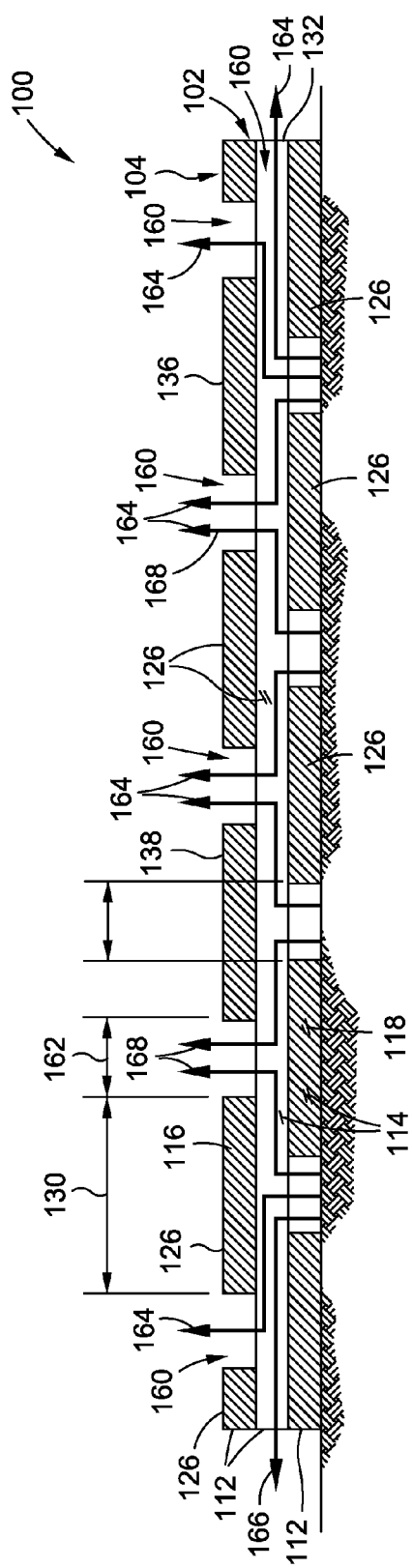
FIG. 4 is a diagrammatic representation of a schematic sectional view of a composite layup illustrating an example of a network of breather paths formed by fluidly interconnected gaps in the composite layup in accordance with one example embodiment.

Referring now to the drawings which are provided for purposes of illustrating various embodiments of the present disclosure, shown in FIG. 1 is a flowchart having one or more operations that may be included in a method 400 of manufacturing a composite laminate 106 (FIG. 13). Step 402 of the method includes laying up bands 126 of fiber-reinforced polymer matrix material (i.e., composite material) in a manner forming engineered evacuation gaps 160 between the bands 126 of composite material in one or more layers 112 of a composite layup 100, as shown in FIG. 2. The gaps 160 in the layers 112 may be fluidly connected to one another to create an interconnected network of breather paths 164 within the composite layup 100, as shown in FIGS. 3-4. The breather paths 164 may open to an exterior of the composite layup 100 to allow for the evacuation of gas which may include entrapped air, moisture, and/or volatiles from the interior of the composite layup 100 during consolidation and/or curing of the composite layup 100, and resulting in a cured composite laminate 106 having relatively low porosity. The relatively low porosity of the composite laminate 106 may correspond to improved mechanical properties of the composite laminate 106.

Advantageously, the method may allow for the use of pre-impregnated fiber-reinforced composite material (i.e., prepreg) containing resin 108 (FIG. 2) formulated for processing at no greater than 1 atmosphere of compaction pressure 214 (e.g., out-of-autoclave processing) (FIG. 11) during curing of the composite layup 100, and may achieve laminate quality (e.g., less than 2 percent porosity by volume) that is comparable or at least equivalent to the quality of laminates cured in an autoclave at pressures greater than 1 atmosphere. Furthermore, the method allows for automated fiber placement (AFP) (e.g., see FIGS. 5-6) of fully-impregnated composite material to achieve low porosity levels previously only achievable with manually laid up laminates formed of partially-impregnated composite material cured out of the autoclave. Partially-impregnated composite material may be incompatible with AFP machines 300 (FIG. 5) due to foreign-object-debris (FOD) such as fuzz balls that may be generated when dry fibers on the sides of partially-impregnated slit-tape (i.e., tows) abrade against the tow delivery system of the AFP machine 300 when laying up the tows. The build up of FOD may result in excessive down-time of the AFP machine 300 to clear the FOD and re-thread the tows through the tow delivery system.

In the present disclosure, the ability to use automated fiber placement of fully-impregnated composite material in combination with out-of-autoclave processing (e.g., vacuum bagging) results in a significant reduction in manufacturing cost and allows for a significant increase in production rate relative to conventional composite manufacturing methods that rely on hand layup and/or autoclave processing. However, any one of the examples of the presently-disclosed method may include processing (e.g., curing) the composite layup 100 inside of an autoclave, which may allow for the application of greater than 1 atmosphere of compaction pressure on the composite layup 100 to achieve relatively low porosity levels in the cured composite laminate 106.

Referring to FIG. 2, shown is an uncured composite layup 100 made up of a stack of layers 112 each formed of bands 126 of composite material. Each layer 112 may include one or more engineered gaps 160 extending lengthwise between adjacent bands 126. The composite layup 100 may contain a network of the gaps 160. Gaps 160 may be formed in the layers 112 during the layup of the continuous bands 126 of composite material. A layer 112 may have at least one gap 160 between opposing band side edges 128 (FIG. 3) of an adjacent pair of bands 126.

A gap 160 may extend continuously uninterrupted in an in-plane direction of the layer 112 along a lengthwise direction 134 (FIG. 2) of the bands 126 (FIG. 2). For example, a gap 160 (FIG. 2) may extend along an entire band length defined as the distance between opposite band ends 132 on opposite sides of a layer 112. However, a gap 160 may extend along a portion of the band length. For example, although not shown, a gap 160 in one or more layers 112 may extend continuously from an interior location of a layer 112 to an exterior side 102 of the composite layup 100 (FIG. 2) such that gap 160 does not extend continuously from one band end 132 to an opposite band end 132. In any of the examples disclosed herein, an entire gap 160 or portions of a gap 160 may be fluidly closed off from one or more exterior sides 102 (FIG. 2) of the composite layup 100, and may be fluidly open to an exterior top 104 of the composite layup 100. In other examples, an entire gap 160 or portions of a gap 160 may be fluidly closed off from an exterior top 104 (FIG. 2) of the layup, and may instead be fluidly open to one or more exterior sides 102 of the composite layup 100.

A band 126 of composite material may be made up of one or more unidirectional tows 142 or a band 126 of composite material may be made up unidirectional tape 136. A tow 142 may be described as slit-tape, and may be formed as a continuous narrow strip of composite material having a thickness of several thousands of an inch (e.g., 0.005-0.010 inch, such as 0.007 inch). Tows (i.e., slit tape) may be formed by slitting unidirectional tape 136 into smaller widths. A tow 142 may be commonly available in widths of 0.125 inch, 0.25 inch, and 0.5 inch, although a tow 142 may be provided in any width, without limitation. A single tow 142 may be made up of a bundle of several thousand continuous parallel reinforcing fibers or filaments 110 (e.g., 1000 to 100,000 or more reinforcing filaments) bundled together (e.g., see FIG. 12). In the present disclosure, unidirectional tape 136 may be described as having a tape width of greater than 1 inch. Unidirectional tape may be commonly available in widths of 6 inches or 12 inches although unidirectional tape 136 may be provided in other widths.

In the present method, the step of laying up a composite layup 100 with engineered gaps 160 may be implemented with unidirectional tows 142 using an AFP machine 300 (FIGS. 5-6) laying up tows 142 such as on a layup tool 200. The method may also be implemented with unidirectional tape 136 using an automated tape layup (ATL) machine (not shown). Even further, the method may be implemented using filament winding of unidirectional tow 142 or tape onto a rotatable mandrel (not shown). However, the method may be implemented using any type of composite material, and is not limited to using tows 142 or tape 136. For example, the bands 126 or composite material may include bands 126 (FIG. 3) of woven fabric, bands 126 of chopped fiber mats, or bands 126 of composite maternal in any one of a variety of other forms, without limitation.

In FIG. 2, the composite layup 100 is shown as a quasi-isotropic layup having bands 126 with fibers oriented at 0, ±45, and 90 degree fiber angles. However, the bands 126 of composite material in a composite layup 100 may be arranged in any one of a variety of different fiber orientations (e.g., 0, 22.5, 30, 45, 60, 75, 90 degrees or other fiber angles). The layers 112 may be stacked according to a predetermined stacking sequence to achieve the desired strength and stiffness properties of the final composite laminate 106. The present method may also be implemented for forming engineered gaps 160 in other types of composite layups 100 including non-traditional layups (e.g., a non-quasi-isotropic layup) and steered fiber layups.

In some examples, composite material may be fully impregnated with resin 108 prior to laying up into a composite layup 100. Full impregnation may be described as the individual fibers or filaments 110 in each tow 142 or tape being surrounded by resin 108 (e.g., see FIG. 12). However, the method may also be implemented using composite material that may be partially impregnated with resin 108 (not shown) prior to laying up into a composite layup 100. For example, the filaments 110 in the composite material may be impregnated at less than 90 percent of full impregnation, such that some of the filaments 110 may not be completely surrounded by resin 108. The material from which the filaments 110 may be formed may include aramids, polyolefins, metal, glass, carbon, boron, ceramic, mineral, and any one of a variety of other materials or combination of materials.

The composite material may be a thermosetting composite material pre-impregnated with thermosetting resin 108 or with thermoplastic resin 108. The resin 108 may be provided in any one of a variety of material compositions including, but not limited to, acrylics, epoxies, fluorocarbons, polyamides, polyethylenes, polyesters, polypropylenes, polycarbonates, polyurethanes, polyetheretherketones, polyetherketoneketones, polyetherimides, bismaleimides, and other material compositions. In one example, the thermosetting resin 108 may be an epoxy-based resin system formulated for curing at compaction pressures of no greater than 1 atmosphere, such as for out-of-autoclave curing of the composite layup 100. An example of an epoxy-based resin system formulated for out-of-autoclave processing may include resin designated as Cycom™ 5320-1, commercially available from Cytec Engineering of Woodland Park, N.J. Although the present method is described in the context of prepreg composite material formed of thermosetting resin 108, in some examples, the prepreg composite material may include thermoplastic resin 108. In this regard, the below-described steps of laying up and curing a composite layup 100 may encompass layup up and solidifying the thermoplastic resin 108 in the prepreg composite material.

FIGS. 3 and 4 show schematic representations of a composite layup 100 having a plurality of gaps 160. The gaps 160 may extend lengthwise between adjacent bands 126 (e.g., between tows or tape) of composite material in each layer 112. The bands 126 may be parallel to one another and may be configured as unidirectional tape 136 and/or as unidirectional tows 142. A course 138 may include one or more side-by-side tows 142 which may be laid up at once such as by an AFP machine 300 as a fiber placement head 306 (FIGS. 5-6) traverses a head path. The side edges of the side-by-side tows 142 in a course 138 may be non-overlapping and may be non-gapped with one another. The gaps 160 between bands of composite material in two or more of the layers 112 may be fluidly interconnected or fluidly coupled to one another in at least one location of the composite layup 100 to form an interconnected network of breather paths 164 for venting entrapped air, moisture, volatiles, and other gases from the interior of the composite layup 100 to the exterior of the composite layup 100.

One or more of the breather paths 164 (FIG. 4) may be open to an exterior of the layup for evacuation of entrapped air, moisture, volatiles, and other gases from interior layers 114 (FIG. 3) including a lowermost layer 118 (FIG. 3) of the composite layup 100 during consolidation and/or curing. For example, one or more breather paths 164 may open to one or more exterior sides 102 (FIG. 3) of the composite layup 100 to provide relatively high in-plane gas permeability 166 (FIG. 3). In addition, one or more breather paths 164 may open up to the top 104 (FIG. 3) of an uppermost layer 116 (FIG. 3) of the composite layup 100 (FIG. 3) providing relatively high gas permeability in the through-thickness direction of the composite layup 100. The relatively high through-thickness gas permeability 168 (FIG. 3) represents a significant improvement over manually laid up partially-impregnated composite material which provides gas permeability only in the in-plane direction due to the partial impregnation of the composite material.

In the present disclosure, the step of laying up the composite material may include laying up bands 126 (FIG. 4) of composite material in a manner such that at least one of the layers 112 (FIG. 4) includes at least one gap 160 (FIG. 4) having a gap width 162 (FIG. 4) in the range of from approximately 2-5 percent of the band width 130 (FIG. 4) of at least one of the bands 126. The gap width 162 (FIG. 4) may be described as the distance between the band side edges 128 (FIG. 3) of a pair of adjacent bands 126. In one example, composite material may be laid up to form one or more gaps 160 in one or more layers 112, wherein each gap 160 has a gap width 162 of no greater than approximately 3 percent of the band width 130. The gap width 162 of each gap 160 may be limited to less than 5 percent of the band width 130. More preferably, each gap 160 may have a gap width 162 of approximately 3 percent of the band width 130 as a means to prevent fibers in an adjacent layer 112 (e.g., a layer 112 located directly above the layer 112 containing the gap) from dipping into the gap 160 during consolidation and/or curing of the composite laminate 106 (FIG. 13) and which may result in premature blockage of the gap 160 prior to curing, and/or which may result in fiber wrinkling in the cured composite laminate 106.

For embodiments wherein the band 126 (FIG. 4) is a course 138 (FIG. 6) comprised of one or more tows 142 (FIG. 6) of composite material, the method may include laying up a plurality of courses 138 to form layers 112 (FIG.

4) of a composite layup 100, wherein at least one of the layers includes a gap 160 (FIG. 4) between at least one adjacent pair of courses 138, and wherein the gap width 162 (FIG. 4) is no greater than approximately 3 percent of the course width 140. For example, a course 138 having a course width 140 of 1 inch may be comprised of four (4) side-by-side tows 142 each having a nominal tow width 146 (FIG. 8) of 0.25 inch. A plurality of parallel courses 138 may be laid up to form a layer 112 having gaps 160 with a gap width 162 of between approximately 0.005-0.040 inch between each pair of courses 138 and, more preferably, a gap width 162 of between approximately 0.005-0.030 inch between each pair of courses 138. In one example, the gap width 162 is preferably approximately 0.030 inch (e.g., ±0.005 inch) between each pair of courses 138. In examples wherein there is a gap 160 between each one of the tows 142, the gap width 162 may be smaller than 0.030 inch. For example, the gap width 162 between each one of the tows 142 may be approximately 0.005-0.010 inch.

Figure 5:
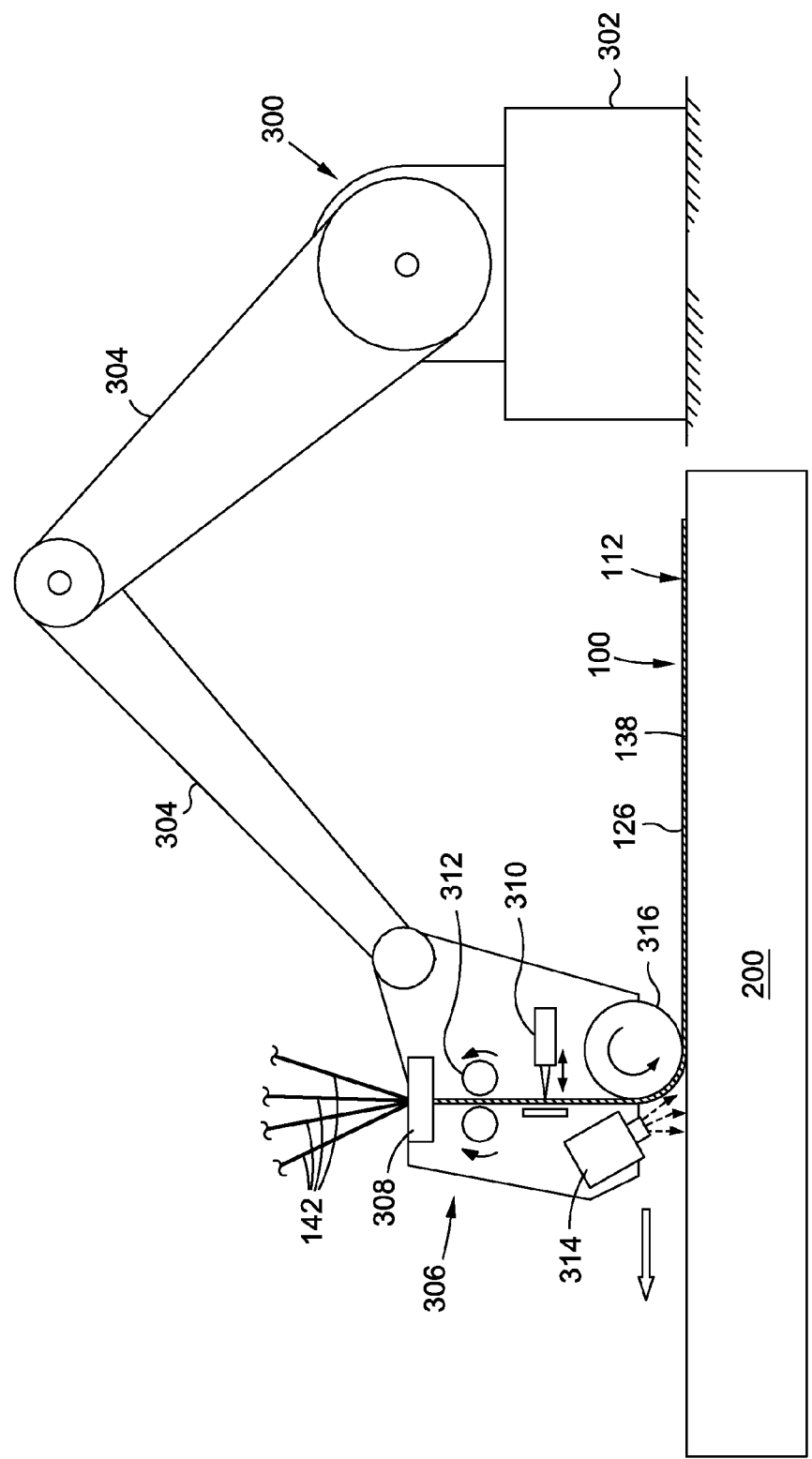
FIG. 5 is a diagrammatic representation of a side view of an automated fiber placement (AFP) machine applying a course of composite material onto a layup tool in accordance with one example embodiment.

FIG. 5 is a side view of an AFP machine 300 as may be implemented for laying up courses 138 of composite material onto a tool surface of a layup tool 200. The AFP machine 300 may include a base 302 and one or more articulated arms 304 which may be rotatably coupled to the base 302. A fiber placement head 306 may be mounted on an end of an articulated arm 304. Although the layup tool 200 is shown having a generally flat or planar configuration, the layup tool 200 may be provided in any size, shape, and configuration, and may include a contoured tool surface. It should be noted that implementation of the presently-disclosed method is not limited to layup on stationary tools, and may be implemented on movable tools such as a rotatable mandrel (not shown). In addition, the present method may be implemented using manual layup of composite material, and is not limited to automated layup such as automated fiber placement, automated tape layup, and filament winding.

Figure 6:
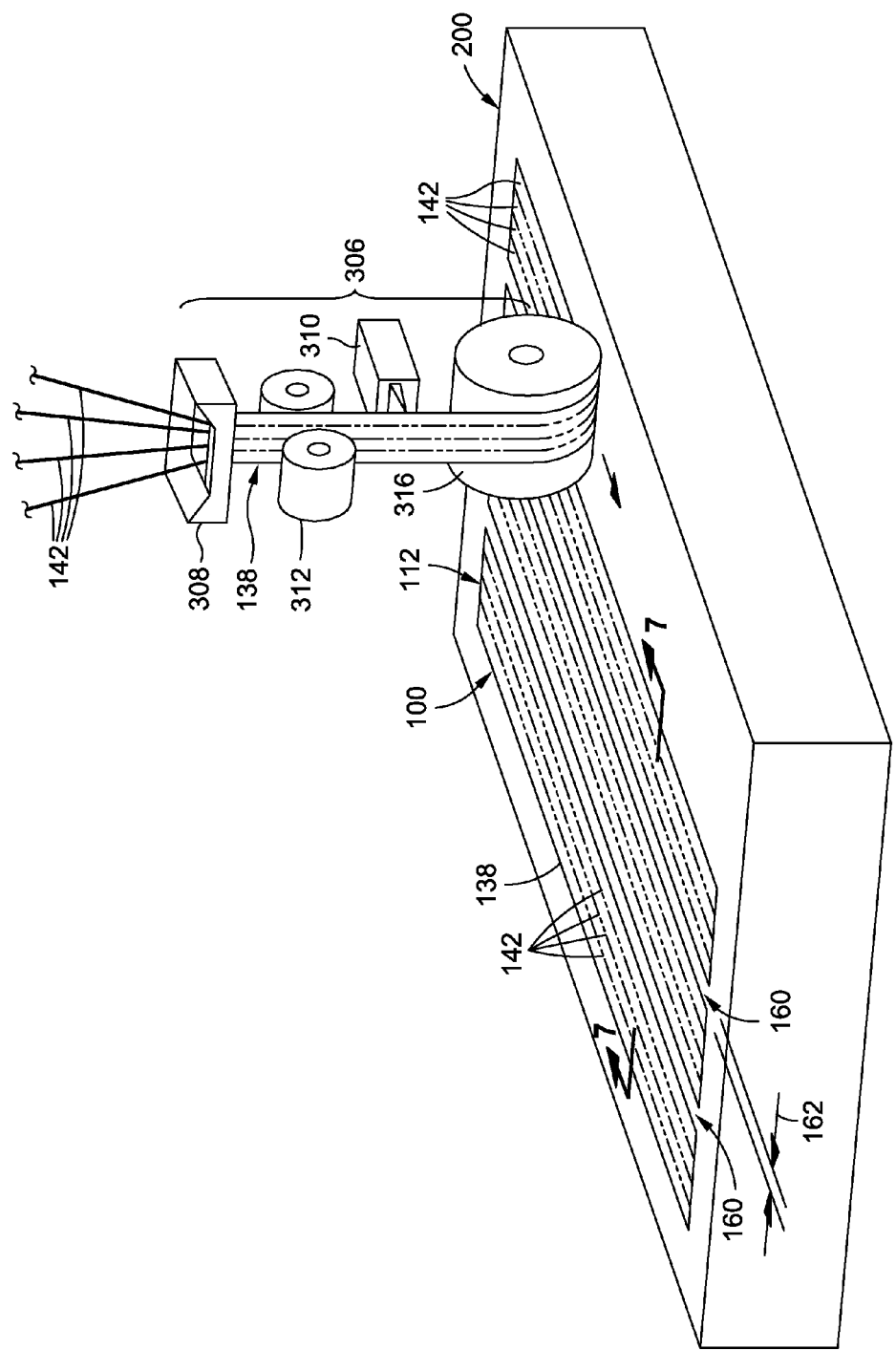
FIG. 6 is a diagrammatic representation of a perspective view of a fiber placement head of an AFP machine applying a course onto a layup tool and illustrating gaps between previously-laid courses in accordance with one example embodiment.

FIG. 6 is a perspective view of a fiber placement head 306 of an AFP machine 300 (FIG. 5) applying a course 138 onto a layup tool 200 to form a layer 112 of a composite layup 100. The layer 112 includes gaps 160 between adjacent courses 138. The AFP machine 300 may include the fiber placement head 306 which may have a collimator 308 for redirecting and aligning a plurality of tows 142, a nip 310 for cutting the tows 142, one or more feed rollers 312 for feeding the tows 142, and a compaction roller 316 for pressuring the tows 142 onto the substrate (e.g., the tool surface or a previously-laid tow). The fiber placement head 306 may further include a heater 314 (FIG. 5) for locally increasing the temperature of the tow 142 and the substrate at a location directly in front of the moving compaction roller 316. Locally increasing the temperature may locally increase the surface tack (e.g., the stickiness) of the substrate and/or the newly-laid tow 142 such that the newly-laid tow 142 adheres to the substrate to prevent movement of the newly-laid tow 142 once it is applied.

Figure 7:
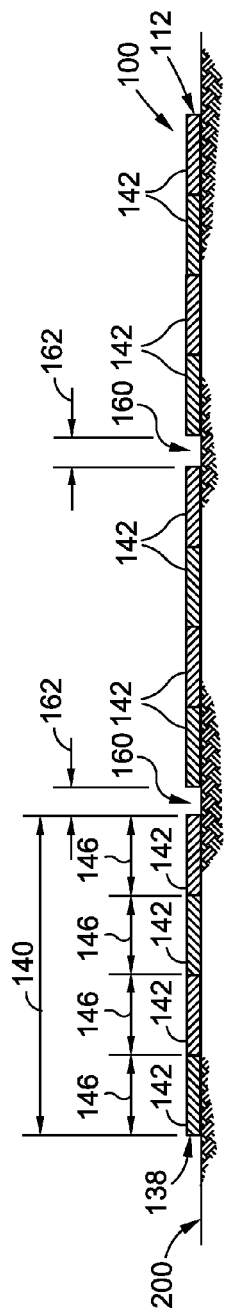
FIG. 7 is a diagrammatic representation of a sectional view of courses on the layup tool taken along line 7 of FIG. 6 and illustrating the courses made up of four (4) side-by-side tows and further illustrating gaps between the courses in accordance with one example embodiment.

FIG. 7 is a sectional view of an example of a plurality of courses 138 that may be applied to a substrate such as to a layup tool 200 using an AFP machine 300 (FIG. 5) in a manner providing gaps 160 between adjacent courses 138. In FIG. 7 each course 138 is made up of four (4) tows 142 in side-by-side arrangement. However, a course 138 may include any number of tows 142 in side-by-side arrangement, as mentioned above. An AFP machine 300 may be programmed to provide a gap 160 between one or more adjacent pairs of courses 138 as distinguished from conventional programming of an AFP machine 300 to layup courses 138 with no overlaps and no gaps between the side edges of adjacent courses 138.

Figure 8:
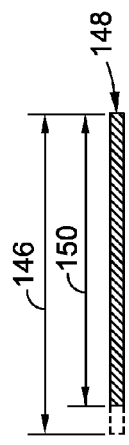
FIG. 8 is a diagrammatic representation of a sectional view of a single tow formed as an under-slit tape having an under-slit tape width that is less than a nominal tow width in accordance with one example embodiment.
Figure 9:
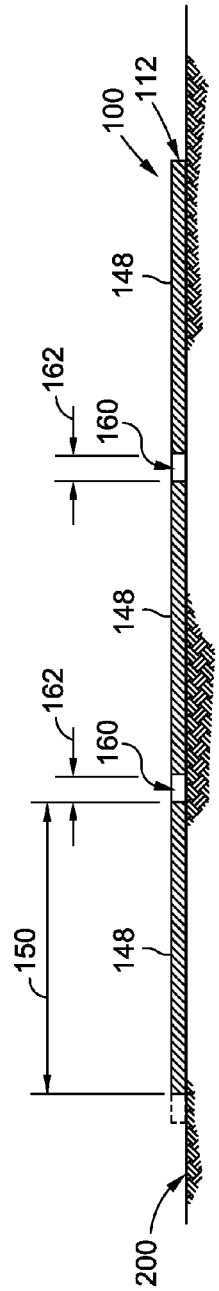
FIG. 9 is a diagrammatic representation of a sectional view of an example of under-slit tapes that an AFP machine may be designed to lay up to provide gaps between adjacent pairs of under-slit tape in accordance with one example embodiment.

FIGS. 8-9 illustrate a further example of the application of tows 142 (FIG. 5) to a layup tool 200 (FIG. 5) using an AFP machine 300 (FIG. 5) in a manner providing gaps 160 between the tows 142. FIG. 8 is a sectional view of a single tow 142 formed as an under-slit tape 148 (i.e., an under-slit tow) having an under-slit tape width 150 that is less than a nominal tow width 146. For example, a conventional tow 142 may be provided in a nominal tow width 146 of 0.50 inch. In contrast, an under-slit tape 148 may be provided in an under-slit tape width 150 of 0.485 inch. FIG. 9 is a sectional view of a plurality of under-slit tapes 148 applied to a layup tool 200 using an AFP machine 300 designed or programmed to lay up nominal width tows 142 in side-by-side arrangement (i.e., non-gapped arrangement). In the present example, the use of the under-slit tape 148 results in the formation of gaps 160 of 0.015 inch between each one of the under-slit tapes 148.

Figure 10:
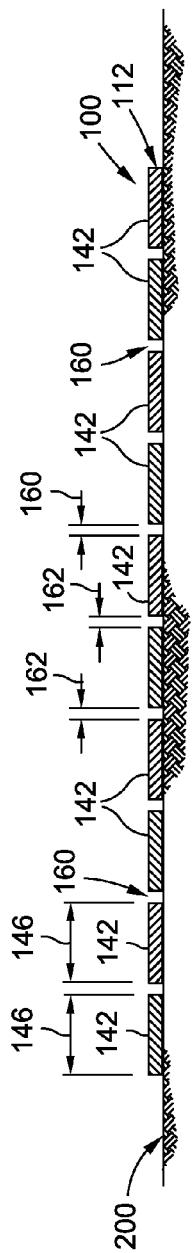
FIG. 10 is a diagrammatic representation of a sectional view of an example of nominal width tows that may be laid up by an AFP machine to provide gaps between the adjacent nominal width tows in accordance with one example embodiment.

FIG. 10 is a sectional view of an example of a plurality of tows 142 of nominal width that may be laid up by an AFP machine 300 (FIG. 5) to provide gaps 160 between each one of the tows 142. In one example, the fiber placement head 306 (FIG. 5) of the AFP machine 300 may be modified to apply four (4) tows 142 each having a nominal width of 0.50 inch, and to provide a gap 160 of 0.015 inch between each pair of adjacent tows 142. In this regard, the modification of the fiber placement head 306 may result in a gap width 162 of 3 percent (0.015 inch/0.50 inch) of the nominal tow width 146. However, the fiber placement head 306 may be modified to provide a gap width 162 of less than 0.015 inch or greater than 0.015 inch between one or more of the adjacent pairs or tows 142. In addition, the gap width 162 may be different between different pairs of tows 142, and is not necessarily the same gap width 162 between each one of the tows 142.

Figure 11:
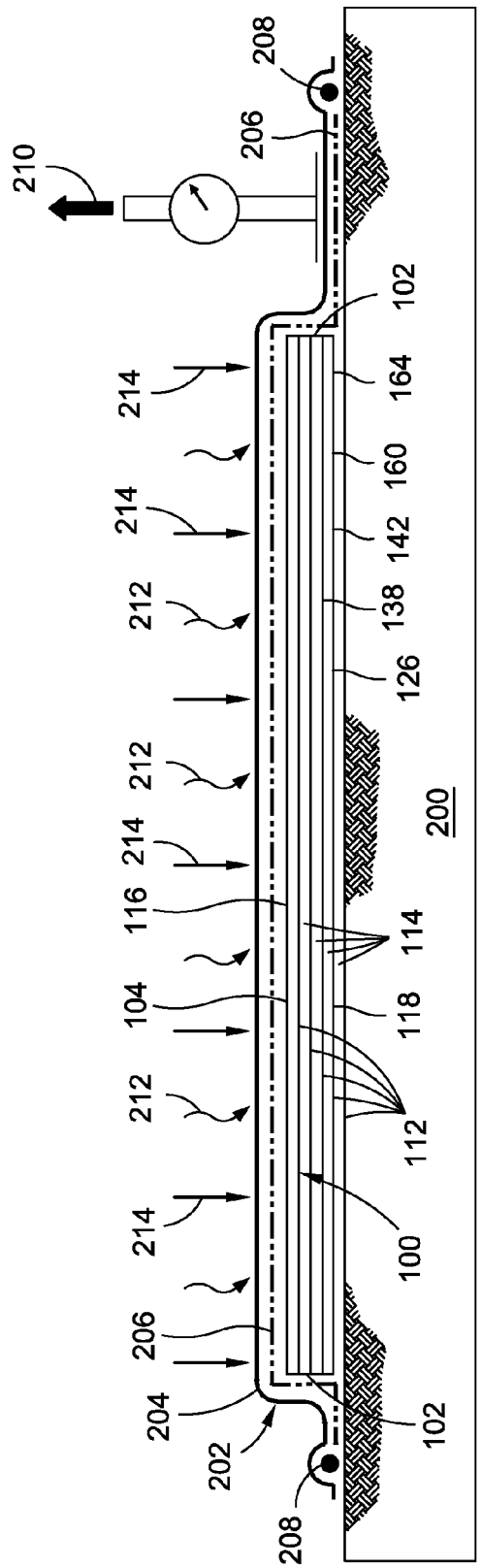
FIG. 11 is a diagrammatic representation of a side view of a vacuum bag applying compaction pressure during curing of the composite layup to form a cured composite laminate.

FIG. 11 shows vacuum bag 202 processing of a composite layup 100. The vacuum bag 202 may be implemented for performing Step 404 of the method 400 (FIG. 1) which may include applying compaction pressure 214 to a composite layup 100 having gaps 160 between the bands 126 of composite material for venting gasses (e.g., volatiles, entrapped air, and/or moisture) from the composite layup 100 during consolidation and/or curing. The vacuum bag 202 may include a bagging film 204 which may be sealed to the layup tool 200 along the perimeter edges of the bagging film 204 such as by using an edge sealant 208. The vacuum bag 202 may include one or more layers such as a breather layer 206 to maintain a flow gap between the composite layup 100 and the bagging film 204 to allow the vented gases to flow toward the vacuum port for removal from the vacuum bag interior. In addition, the breather layer 206 may allow for substantially uniform application of vacuum pressure 210 to consolidate the composite laminate layup 100 against the tooling surface of the layup tool 200.

Additional layers may be included with the vacuum bag 202 (FIG. 11) such as a release layer (not shown) to facilitate removal of the vacuum bag 202 from the composite laminate 106 (FIG. 13) after curing, and/or a release coat (not shown) which may be applied to the tooling surface prior to laying up the composite material. Vacuum pressure 210 (FIG. 11) may be applied to the bagging film 204 (FIG. 11) by a vacuum source such as a vacuum pump (not shown) to apply compaction pressure 214 (FIG. 11) for consolidating the composite layup 100. Although the composite layup 100 is vacuum-bagged, consolidation of the composite layup 100

(FIG. 11) may be performed using other means including, but not limited to, a mechanical press, a caul plate, or other compaction means. As indicated above, the presently-disclosed method allows for the application of compaction pressure 214 in an out-of-autoclave process such as by using a vacuum bag 202. However, any portion of the consolidation or curing of a composite layup 100 may be performed inside an autoclave.

Step 406 of the method 400 may include consolidating the composite layup 100 in response to the application of compaction pressure 214 (FIG. 11), and may result in the venting of gasses such as volatiles, entrapped air, and/or moisture through the gaps 160 (FIG. 11) forming the fluidly interconnected breather paths 164 (FIG. 11) in the interior of the composite layup 100 (FIG. 11). The gases may be vented out of the composite layup 100 through one or more of the breather paths 164 such as during consolidation and/or curing of the composite layup 100 to form a cured composite laminate 106 (FIG. 13). The step of consolidating the layup may be performed prior to and/or during the heating and curing of the composite layup 100.

The step of applying compaction pressure 214 to the composite layup 100 may include vacuum bagging the uncured composite layup 100 as shown in FIG. 11, and applying no more than 1 atmosphere of compaction pressure 214 to the composite layup 100 using vacuum bag processing. As indicated above, the resin 108 (FIG. 2) in the composite material may be formulated to allow for out-of-autoclave processing (e.g., curing) of the composite layup 100 and which may limit compaction pressures to no more than 1 atmosphere such as when using a vacuum bag 202. However, as indicated above, compaction pressure 214 may be applied by any one of a variety of different means including, but not limited to, autoclave processing or processing using a press clave or other device for applying compaction pressure 214 to the composite layup 100.

The step of applying compaction pressure 214 (FIG. 11) may further include controlling the compaction pressure 214 on the composite layup 100 (FIG. 11) in a manner preventing premature closing off of one or more of the gaps 160 (FIG. 4) and/or breather paths 164 (FIG. 4) prior to fully curing the composite layup 100. In this regard, compaction pressure 214 may be monitored to avoid exceeding a pressure threshold that may otherwise cause resin 108 (FIG. 2) to flow into one or more portions of a gap 160 which may have the effect of preventing the evacuation of gases from the interior of the composite layup 100 to the exterior of the composite layup 100. In one example, compaction pressure 214 may be limited to approximately 30 psi to prevent premature closing off of the gaps 160. Although not shown, compaction pressure 214 may be monitored by one or more pressure sensors that may be included in different locations of the composite layup 100. The pressure sensors may transmit signals to a monitoring system (not shown) which may regulate vacuum pressure 210 (FIG. 11) to avoid exceeding a predetermined pressure threshold.

Step 408 of the method 400 (FIG. 1) may include applying heat 212 (FIG. 11) to the composite layup 100 (FIG. 11) to elevate the temperature of the resin 108 for reducing the resin viscosity so that the resin 108 in adjacent tows 142 (FIG. 11) or tapes may flow and intermingle. The application of heat 212 may also initiate a chemical cross-linking process for curing thermosetting resin. The method may include controlling the temperature of the composite layup 100 in such a manner preventing premature closing off of the breather paths 164 (FIG. 4) prior to completion of cure of the layup. As indicated above, both temperature and compaction pressure 214 may be controlled to prevent closing off of the breather paths 164. In this regard, the temperature and/or compaction pressure 214 (FIG. 11) may be limited to a level such that continuity of the gaps 160 (FIG. 4) is maintained and such that the composite material maintains an original level of tack when the resin 108 is heated to the gel point.

Step 410 of the method 400 may include curing the composite layup 100 (FIG. 11) in response to the application of heat 212 (FIG. 11). During the cure cycle, the composite laminate 106 (FIG. 2) may be heated to one or more temperatures and held at specific temperatures for predetermined hold times to fully cure the composite layup 100 and form the final composite laminate 106. For the above mentioned epoxy-based resin system designated as Cycom™ 5320-1, the step of heating the composite layup 100 may include maintaining a temperature of the resin 108 (FIG. 11) below approximately 115 F to prevent closure of the breather paths 164 (FIG. 4) during consolidation and prior to curing the composite layup 100 to allow for complete venting of entrapped gasses and moisture in the composite layup 100.

Step 412 of the method 400 (FIG. 1) may include venting gasses (e.g., volatiles, entrapped air, moisture) through the breather path 164 (FIG. 4) and out of the composite layup 100 (FIG. 11) during curing of the composite layup 100. As indicated above, the curing of the composite layup 100 may be performed during or after consolidation of the composite layup 100 during which time gasses may be vented through the gaps 160 (FIG. 4) and interconnected breather paths 164 in the interior of the composite layup 100. Upon the evacuation of moisture, entrapped air, and/or volatiles from the composite layup 100, the resin 108 (FIG. 11) and fibers may flow under pressure into the gaps 160 to create a porosity-free cured composite laminate 106 (FIG. 13). Although the present disclosure describes a method for forming a cured composite laminate 106 as a solid laminate of a composite article, the cured composite laminate 106 may be a face sheet of a sandwich panel. A sandwich panel may be comprised of a pair of the face sheets, one or both of which may be formed using the method disclosed herein, and may include a core (e.g., foam, honeycomb, etc.) interposed between and coupling the face sheets.

FIG. 12 is a sectional view of a portion of the composite layup 100 of FIG. 2 prior to curing and illustrating the gaps 160 that may be provided between one or more pairs of bands 126 (e.g., tape 136 and/or tows 142) in one or more of the layers 112. FIG. 12 illustrates gaps 160 between the tows 142 in each layer 112. As indicated above, FIG. 2 may represent a quasi-isotropic layup comprised of tows 142 oriented at 0, ±45, and 90 degree fiber angles. Each tow 142 may be made up of several thousand continuous parallel reinforcing filaments 110 bundled together. The tows 142 may be fully impregnated with resin 108 prior to layup such that the individual filaments 110 in each tow 142 are surrounded by resin 108.

FIG. 13 is a sectional view of the composite layup 100 of FIG. 12 after consolidation and curing. The gaps 160 shown in FIG. 12 allow for the evacuation of gases (e.g., entrapped air, moisture, volatiles) from the interior of the composite layup 100. During consolidation and curing, the compaction pressure 214 and temperature may be controlled to maintain the gaps 160 in an open condition to facilitate evacuation of gases from the interior of the composite layup 100. Once the gases have evacuated, the reduction in resin viscosity due to heating of the resin 108 may allow the resin 108 and fibers to fill the gaps 160 under compaction pressure 214 (FIG. 11) to produce a cured composite laminate 106 having low porosity.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A method of manufacturing a composite laminate, comprising:
    laying up bands of composite material in multiple layers to form a composite layup, the bands being non-woven, at least three of the layers in the composite layup each having at least one gap between an adjacent pair of bands in the same layer, the gaps extending continuously along a lengthwise direction of the bands; and
    the gap in the at least three layers being fluidly interconnected and forming at least one non-line-of-sight breather path that opens to an exterior of the composite layup and excluding line-of-sight breather paths in a through-thickness direction of the composite layup.

2. The method of claim 1, wherein the step of laying up the composite material comprises:
    forming gaps that are fluidly interconnected and that allow in-plane gas permeability and through-thickness gas permeability of the composite laminate.

3. The method of claim 1, wherein the step of laying up the composite material comprises:
    laying up bands of composite material in a manner such that at least one of the layers includes at least one gap having a gap width of no greater than approximately 3 percent of a band width.

4. The method of claim 1, wherein the step of laying up the bands of composite material comprises:
    laying up bands of composite material in a manner such that a gap width of each gap is no greater than approximately 0.030 inch.

5. The method of claim 1, wherein the step of laying up the bands of composite material comprises:
    laying up bands of composite material using at least one of automated tape layup, automated fiber placement, filament winding, and manual layup.

6. The method of claim 1, wherein the step of laying up the bands of composite material comprises laying up tows of composite material using an automated fiber placement machine having at least one of the following configurations:
    programmed to provide a gap between one or more pairs of courses, each course containing one or more tows of composite material;
    configured to lay up under-slit tape in a manner forming gaps between the under-slit tape; and
    having a fiber placement head modified to lay up a plurality of nominal width tows with a gap between the tows.

7. The method of claim 1, wherein the step of laying up the bands of composite material comprises:
    laying up at least some of the bands as courses, each course including one or more tows, the tows in a course containing multiple tows arranged side-by-side.

8. The method of claim 1, further including:
    applying compaction pressure to the composite layup;
    consolidating the composite layup in response to application of compaction pressure; and
    venting gasses through the breather path and out of the composite layup during consolidation of the composite layup.

9. The method of claim 8, wherein:
    the step of applying compaction pressure is performed in an out-of-autoclave process.

10. The method of claim 8, wherein the step of applying compaction pressure comprises:
    vacuum bagging the composite layup; and
    applying no more than 1 atmosphere of compaction pressure to the composite layup.

11. The method of claim 8, further including:
    controlling compaction pressure on the composite layup in a manner that prevents closing off of the breather path prior to curing the composite layup.

12. The method of claim 1, further including:
    applying heat to the composite layup;
    curing the composite layup in response to application of heat to form a cured composite laminate; and
    venting gasses through the breather path and out of the composite layup during curing of the composite layup.

13. The method of claim 12, further including:
    controlling a temperature of the composite layup in such a manner as to prevent closing off of the breather path prior to completion of cure of the composite layup.

14. The method of claim 13, wherein:
    a porosity of the cured composite laminate is less than approximately 2 percent.

15. The method of claim 13, wherein:
    the cured composite laminate is one of the following: a solid laminate, a face sheet of a sandwich panel.

16. The method of claim 1, further including:
    laying up bands of composite material in layers to form a composite layup, each layer having gaps between adjacent pairs of bands and extending continuously along a lengthwise direction of the band, the gaps being fluidly coupled and forming breather paths that open to an exterior of the composite laminate;
    applying heat and compaction pressure to the composite laminate;
    consolidating the composite laminate in response to application of compaction pressure;
    curing the composite laminate in response to application of heat; and
    controlling a temperature and compaction pressure of the composite layup in such a manner as to prevent closing off of the gaps and/or the breather paths during consolidation and prior to completion of cure of the composite layup.

17. The method of claim 16, further including:
    allowing, after evacuation of gasses through the breather paths, resin and fibers to flow and fill the gaps during the curing of the composite layup to form a cured composite laminate; and
    the cured composite laminate having a porosity of less than approximately 2 percent.

18. A method of manufacturing a composite laminate, comprising:
    laying up tows of composite material in multiple layers to form a composite layup using an automated fiber placement machine providing gaps with a gap width of between 0.005-0.030 inch between an adjacent pair of the tows in at least three of the layers of the composite layup, the tows being non-woven, the gaps in the at least three layers being fluidly connected to one another and forming an interconnected network of non-line-of-sight breather paths that each open to an exterior of the composite layup and excluding line-of-sight breather paths in a through-thickness direction of the composite layup; and applying no more than 1 atmosphere of compaction pressure to the composite layup via a vacuum bag in an out-of-autoclave process.

19. The method of claim 18, wherein:

the composite material is a thermosetting composite material containing an epoxy-based resin.

20. The method of claim 19, further including:

maintaining a temperature of the epoxy-based resin below approximately 115 F; and preventing closing off of the breather paths prior to curing the composite layup.

\* \* \* \* \*